Patented Sept. 2, 1941

2,254,301

UNITED STATES PATENT OFFICE 2,254,301

COMPOSITION OF MATTER

Franklin A. McCann, Pasadena, Calif., assignor to The Pacific Clay Products Company, Los Angeles, Calif., a corporation of California No Drawing. Application May 17, 1940, Serial No. 335,791

7 Claims. (Cl. 106—71)

This invention relates to a composition of matter, and in particular to a ceramic composition containing the mineral actinolite.

My composition consists of a mixture of actinolite and a binder. The mineral actinolite, which is usually given the formula $$Ca(Mg,Fe)_3Si_4O_{12}$$

occurs in many localities and has not heretofore been employed in compositions, particularly in ceramic compositions. The ratio of magnesium to iron in actinolite is usually from about five to eight. While the chemical composition of the natural mineral varies somewhat, particularly as to this ratio of magnesium to iron, and also to some minor constituents, I have found that a variation such as may occur in nature from specimen to specimen does not affect the usefulness of actinolite in my compositions. The mineral, as it commonly occurs, is in massive form and upon crushing and granulating, breaks down into compact pieces having blunt angles, although some varieties break into somewhat columnar compact pieces. The larger individual particles when calcined or burned in a ceramic kiln assume a dark reddish brown color which is desirable in certain burned ceramic bodies. Finer particles and dust are believed to dissolve in or react to some extent with the bonding clays, or with other binding agents commonly used in the ceramic art, and impart thereto a pleasing dark reddish brown color after firing. While a clay or a mixture of clays constitutes my preferred binding agent, other common materials well-known in the ceramic art may be employed either with the clays or alone, including such materials as clay grog, silica, feldspar, steatite, talc, iron oxide, bentonite, and the like.

In one preferred mixture, I use two parts by weight of actinolite crushed to sixteen mesh and finer, and three parts by weight of bonding clays. The clay and granulated actinolite are mixed together and tempered to the desired consistency by adding water.

Suitable shapes are prepared from this mixture by any of the well-known ceramic forming processes. For example, the mixture of the proper consistency may be extruded by means of an extrusion press to form thin, flat pieces which after drying and firing are suitable for roofing tile and the like. The use of the actinolite particles facilitates the drying of the formed clay-bonded pieces, and it also tends to prevent warping during firing. The dried shaped pieces may be fired in a kiln after the usual ceramic process. One important advantage of my composition containing actinolite is that the pieces molded therefrom may be satisfactorily matured under wide ranges of firing temperatures. I have made good-quality thin roofing tile from the above composition, some of which were fired at cone 01, and others as high as cone 9.

The fired ceramic articles and products containing actinolite made from my composition are unusually resistant to both mechanical and heat shocks, are strong, low in water absorption, and of pleasing surface texture and color. The amount of actinolite which may be used with any selected ceramic bonding material may be varied over a wide range, depending upon the properties desired in the finished article and the manner of forming the article after mixing. Mixtures containing as high as nine parts actionolite to one part of binder may be employed, for example, in dry-pressed shapes. On the other hand, because of the dark color of the burned particles of actinolite it may be used in small amounts of from two to ten parts per hundred of other ceramic mixtures to produce a dark color in spots or patches or throughout the mass when the actinolite is finely ground.

Granules of actinolite calcined without a binder assume a pleasing reddish brown color and may be used with binders such as asphalt, resins, Portland cement and other low-temperature binding agents.

I claim:
1. A composition of matter comprising particles of non-fibrous actinolite and a binder.
2. A ceramic composition comprising actinolite and clay.
3. A ceramic composition comprising actinolite and a ceramic bonding material.
4. A ceramic composition comprising discrete particles of actinolite and a vitrified ceramic bonding material.
5. A ceramic composition comprising granular actinolite, powdered actinolite, and a clay.
6. A ceramic composition consisting of approximately forty parts of actinolite and sixty parts of clay.
7. A ceramic body comprising a heat-matured mixture of actinolite and clay.

FRANKLIN A. McCANN.